(12) United States Patent
Zhou

(10) Patent No.: US 10,273,166 B2
(45) Date of Patent: Apr. 30, 2019

(54) METHOD FOR RECYCLING AMMONIA FROM LOW-CONCENTRATION AMMONIUM CHLORIDE WASTEWATER

(71) Applicant: Baotou City Xijun Environmental science and technology Co., Ltd., Baotou, Inner Mongolia (CN)

(72) Inventor: Zhenxi Zhou, Inner Mongolia (CN)

(73) Assignee: Baotou City Xijun Environmental science and technology Co., Ltd., Baotou, Inner Mongolia (CN)

( * ) Notice: Subject to any disclaimer, the term of this patent is extended or adjusted under 35 U.S.C. 154(b) by 34 days.

(21) Appl. No.: 15/389,513

(22) Filed: Dec. 23, 2016

(65) Prior Publication Data

US 2017/0101326 A1 Apr. 13, 2017

(30) Foreign Application Priority Data

Dec. 25, 2015 (CN) .......................... 2015 1 0985304

(51) Int. Cl.
| | |
|---|---|
| *C02F 1/04* | (2006.01) |
| *B01D 1/18* | (2006.01) |
| *B01D 1/26* | (2006.01) |
| *B01D 1/28* | (2006.01) |
| *C02F 9/00* | (2006.01) |
| *C01F 11/24* | (2006.01) |
| *B01D 5/00* | (2006.01) |
| *C01F 11/30* | (2006.01) |
| *B01J 2/16* | (2006.01) |
| *C02F 101/16* | (2006.01) |
| *C02F 103/04* | (2006.01) |
| *C02F 101/12* | (2006.01) |

(52) U.S. Cl.
CPC .............. *C02F 1/041* (2013.01); *B01D 1/18* (2013.01); *B01D 1/26* (2013.01); *B01D 1/28* (2013.01); *B01D 1/2884* (2013.01); *B01D 5/006* (2013.01); *B01J 2/16* (2013.01); *C01F 11/24* (2013.01); *C01F 11/30* (2013.01); *C02F 1/04* (2013.01); *C02F 1/048* (2013.01); *C02F 9/00* (2013.01); *C02F 2101/12* (2013.01); *C02F 2101/16* (2013.01); *C02F 2103/04* (2013.01); *C02F 2209/02* (2013.01); *C02F 2209/03* (2013.01)

(58) Field of Classification Search
CPC .. C02F 1/04; C02F 1/041; C02F 1/048; C02F 11/24; C02F 11/30; B01D 1/18; B01D 1/28; B01D 1/2884
See application file for complete search history.

(56) References Cited

PUBLICATIONS

Derwent description of Zhou (CN 101475194), Date: 2009.*
IP.com machine translation of Zhou (CN 101475194), Date: 2009.*

\* cited by examiner

*Primary Examiner* — Brian A McCaig

(57) ABSTRACT

A method for comprehensively treating low-concentration ammonia-nitrogen wastewater by completely recycling is disclosed. The low-concentration ammonia-nitrogen wastewater and carbide slag or quick lime are mixed and reacted to obtain a mixed solution containing ammonia water and ammonium chloride. The mixed solution is transferred into an ammonia-water evaporative concentration tower to separate the ammonia water and thus obtain an ammonia vapor and a calcium chloride waste solution. The ammonia vapor is transferred into an ammonia-water cooler, and the calcium chloride waste solution is introduced into an aging pool for aging, and then filtered to obtain a purified calcium chloride solution; and the purified calcium chloride solution is introduced into an MVR triple-effect evaporator for evaporation, so as to obtain distilled water and a concentrated calcium chloride solution. The concentrated calcium chloride solution is introduced into a fluidized bed for spray granulation, so as to obtain an anhydrous calcium chloride product.

7 Claims, No Drawings

METHOD FOR RECYCLING AMMONIA FROM LOW-CONCENTRATION AMMONIUM CHLORIDE WASTEWATER

CROSS REFERENCE OF RELATED APPLICATION

The present invention claims priority under 35 U.S.C. 119(a-d) to CN 201510985304.2, filed Dec. 25, 2015.

BACKGROUND OF THE PRESENT INVENTION

Field of Invention

The invention relates to a method for comprehensively treating low-concentration ammonia-nitrogen wastewater by completely recycling, and particularly relates to a method for recycling ammonia from low-concentration ammonium chloride wastewater, which pertains to the field of comprehensively treating ammonia-nitrogen wastewater.

Description of Related Arts

China is a country being abundant in resources of rare earth, with a rare-earth yield of about 150,000 tons per year, and the low-concentration ammonium chloride wastewater is a discharge liquid inevitably generated in the non-ferrous industry, and especially in the rare-earth wet separation industry. According to statistics, the average consumption of the ammonia water or ammonium bicarbonate for separating one ton rare-earth oxide is greater than 4 tons, and as limited by the production process, the content of ammonium chloride in the discharged wastewater is relatively low (the concentration thereof is mostly 0.35-2 mol/L), and even so the amount of ammonium chloride discharged per year in the rare-earth industry exceeds 1,000,000 tons. Furthermore, synthesizing 1,000,000 tons ammonia requires 800,000,000 cubic meters natural gas, or requires about 300,000 tons anthracite, and thus if the ammonia is not recycled and reused from the wastewater, wasting of resources may be caused. On the other hand, the low-concentration ammonium chloride wastewater may cause serious environment pollution. The discharge of ammonia-nitrogen wastewater in the rare-earth industry across Ganzhou region of Jiangsu province, China had caused a serious pollution event previously, and thus the ammonia-nitrogen content of the Taihu Lake area exceeded a certain limit. In the Baotou area, as the flow of Yellow River was reduced each winter, the seriously excessive ammonia-nitrogen wastewater caused a serious pollution. The environmental protection department of People's Republic of China had pay great attention to this and thus immediately ordered the rare-earth industry to conduct rectification and reformation. Therefore, it is an important technical issue currently plaguing the rare-earth industry how to recycle and reuse the low-concentration ammonia-nitrogen wastewater.

Currently, a commonly-used process for recycling the low-concentration ammonia-nitrogen wastewater mainly is recycling the ammonium chloride by directly crystallizing through evaporative concentration, or recycling hydrochloric acid and ammonia water by evaporating the ammonium chloride together with a circulating agent, wherein the former process is disadvantageous in the following aspects: the direct evaporation causes a great thermal energy consumption, the environmental protection and control operate with money loss, and since the market area of ammonium chloride is affected by a localized selling radius, a large amount of ammonium chloride is piled up and unsalable, and thereby many enterprises have to discontinue the recycling production. The later process is disadvantageous in that concentrations of the produced hydrochloric acid and ammonia water are too low to be used, the process has great power consumption, the cost for operating with money loss is very high, and thereby industrialized production is unable to be conducted.

SUMMARY OF THE PRESENT INVENTION

With respect to the aforementioned defects of the prior art, the object of the invention is to provide a method for recycling ammonia from low-concentration ammonium chloride wastewater. This method is able to not only separate and recycle ammonia from the low-concentration ammonium chloride wastewater until the industrial concentration of the ammonia meets the requirements for continual use in rare-earth separation, but also convert a carbide slag into calcium chloride so as to recycle distilled water and anhydrous calcium chloride products. The process procedure is completely enclosed with low power consumption and valuable elements are completely recycled from the waste, which meets the environmental protection requirements of economically recycling, reusing and circulating without pollution and public hazard.

In order to solve the aforementioned technical problem, the invention adopts a technical solution as follows:

The method of the invention includes the following steps of:

(1) mixing-reacting which comprises uniformly mixing low-concentration ammonium chloride wastewater and carbide slag by stirring, reacting with each other sufficiently, and obtaining a mixed solution containing ammonia water and ammonium chloride;

(2) ammonia separating-absorbing which comprises transferring the mixed solution obtained from the step (1) through a material pump into an ammonia-water evaporative concentration tower, separating the ammonia water, and obtaining an ammonia vapor and a calcium chloride waste solution;

(3) cooling-recycling which comprises transferring the ammonia vapor obtained from the step (2) into an ammonia-water cooler, cooling, absorbing, and after the cooling treatment, storing the obtained ammonia water in an ammonia-water storage tank for standby;

(4) calcium-chloride purifying which comprises introducing the calcium chloride waste solution obtained from the step (2) into an aging pool, aging, filtering and obtaining a purified calcium chloride solution; and (5) calcium-chloride recycling which comprises introducing the purified calcium chloride solution obtained from the step (4) into an MVR triple-effect evaporator, evaporating, obtaining distilled water and a concentrated calcium chloride solution with a concentration by weight of 35%-40%, then introducing the concentrated calcium chloride solution into a fluidized bed, spray granulating, and obtaining an anhydrous calcium chloride product.

In the step (1), a concentration of ammonium chloride in the ammonium chloride wastewater is in a range of 0.35-2 mol/L, and a weight percentage content of calcium oxide in the carbide slag is greater than or equal to 60%.

In the step (1), a weight ratio of the calcium oxide contained in the carbide slag to the ammonium chloride contained in the low-concentration ammonium chloride wastewater is 1:1.2-1.9.

The carbide slag is able to be replaced by quick lime, and a weight ratio of the quick lime to the ammonium chloride contained in the low-concentration ammonium chloride wastewater is 1:0.3-0.6.

In the step (2), the separation of ammonia water as conducted in the ammonia-water evaporative concentration tower is performed by adjusting a vapor flow in such a manner that a tower top temperature is maintained at 90° C.-95° C. and a vapor pressure is in a range of 0.1 MPa-0.6 MPa.

In the step (3), the cooling liquid adopted by the ammonia-water cooler is the ammonium chloride wastewater, the absorption liquid is the distilled water obtained from the step (5), and a cooling temperature is maintained at 10° C.-30° C.

In the step (2), an aging time is greater than or equal to seven days.

Compared with the prior art, the invention has the following advantages:

1. The invention achieves recycle and reuse of the ammonia resource with a low raw-material cost. The raw material used in the invention is the low-concentration ammonium chloride wastewater which is discharged during the rare-earth wet separation or in the non-ferrous industry and has a concentration of 0.35-2 mol/L, such that the recycle and reuse of ammonia resources are achieved, and meanwhile the pollution problems caused by direct discharge of the low-concentration ammonium chloride wastewater are solved. The auxiliary material used in the invention is the calcium carbide waste residue generated during the production of polyvinyl chloride in the chlorine-alkali industry, and the main component of the calcium carbide waste residue is calcium hydroxide which is readily available. The valuable elements are completely recycled through the entire process. Therefore, the environmental protection requirements for reusing wastes are met.

2. The concentration of the ammonia water obtained through the invention is high, the distilled water obtained at the same time is returned into the production for continual use, and the obtained anhydrous calcium chloride product meets the industrial standards. As demonstrated through experiments, the molar concentration of the ammonia water obtained through such a recycling method may be controlled at 8-15 mol/L, which meets the commercial requirements. On the other hand, the pH value of the filter residue obtained by purifying the calcium chloride solution is 7-8 and may be recycled and reused as a raw material of cement, which completely meets the requirements of environmental-protection discharging standards.

3. In the invention, the mainly used devices include the ammonia-water evaporative concentration tower and the ammonia-water cooler, the process procedure is simple, the production is environmental friendly, causes no pollution and has low power consumption, and especially the ammonia separation tower separates and absorbs the ammonia from the mixed solution to meet the industrial concentration standards at once. Ninety percent of the power consumption is acted on the resultant concentrated ammonia water, and the power consumption is far more less than that of a conventional recycling process.

DETAILED DESCRIPTION OF THE PREFERRED EMBODIMENT

Step (1) Reaction process: low-concentration ammonium chloride wastewater and a carbide slag are added into a reactor and reacted sufficiently with each other under stirring, so as to obtain a mixed material liquid containing ammonia and ammonium chloride, wherein the weight ratio of the added carbide slag to the added low-concentration ammonium chloride wastewater is 1:1.2-1.9;

Step (2) Ammonia separation and absorption process: the mixed solution obtained from the step (1) is transferred through a material pump into an ammonia-water evaporative concentration tower to separate the ammonia water and thus obtain an ammonia vapor and a calcium chloride waste solution;

Step (3) Cooling and recycling process: the ammonia vapor obtained from the step (2) is transferred into an ammonia-water cooler so as to be cooled and absorbed, wherein the cooling liquid is the ammonium chloride wastewater and the thermal energy is recycled by transferring the thermal energy of the ammonia gas to the ammonium chloride wastewater, and the ammonia water which is obtained after the cooling treatment and has a weight percentage concentration greater than or equal to 17% is stored in an ammonia-water storage tank and is ready for use; and Step (4) calcium-chloride recycling process: the calcium chloride waste solution obtained from the step (2) is introduced into an aging pool for aging, and then filtered to obtain a purified calcium chloride solution, the purified calcium chloride solution is introduced into an MVR triple-effect evaporator for evaporation, so as to obtain distilled water and a concentrated calcium chloride solution which is concentrated till the weight percentage of calcium chloride is 35-40%, and then the concentrated calcium chloride solution is introduced into a fluidized bed for spray granulation, so as to obtain an anhydrous calcium chloride product.

In the ammonia-water evaporative concentration tower, by adjusting the vapor flow, the tower top temperature is maintained at 85° C.-95° C. and the water-vapor pressure is maintained at 0.1 MPa-0.6 Mpa. As demonstrated by experiments, when the tower top temperature of the ammonia-water evaporative concentration tower is maintained at 85° C.-95° C., after the ammonia is separated, the concentration of the ammonia by weight in the calcium chloride solution is only 0.0020-0.005%.

The aforementioned embodiments are only preferred embodiments of the invention, and are not intended to limit the invention in any way. Any simple modification, change and equivalent structure transformation conducted according to the technical spirit of the invention still fall within the claimed scope of the technical solutions of the invention.

What is claimed is:

1. A method for comprehensively treating low-concentration ammonia-nitrogen wastewater by completely recycling, wherein the method comprises steps of:
    (1) mixing-reacting which comprises uniformly mixing the low-concentration ammonium chloride wastewater and carbide slag by stirring, reacting with each other sufficiently, and obtaining a mixed solution containing ammonia water and ammonium chloride;
    (2) ammonia separating-absorbing which comprises transferring the mixed solution obtained from the step (1) through a material pump into an ammonia-water evaporative concentration tower, separating the ammonia water, and obtaining an ammonia vapor and a calcium chloride waste solution;
    (3) cooling-recycling which comprises transferring the ammonia vapor obtained from the step (2) into an ammonia-water cooler, cooling, absorbing, and after the cooling treatment, storing the obtained ammonia water in an ammonia-water storage tank for standby;

(4) calcium-chloride purifying which comprises introducing the calcium chloride waste solution obtained from the step (2) into an aging pool, aging, filtering and obtaining a purified calcium chloride solution; and (5) calcium-chloride recycling which comprises introducing the purified calcium chloride solution obtained from the step (4) into an MVR triple-effect evaporator, evaporating, obtaining distilled water and a concentrated calcium chloride solution with a concentration by weight of 35%-40%, then introducing the concentrated calcium chloride solution into a fluidized bed spray granulator, and obtaining an anhydrous calcium chloride product.

2. The method of claim 1, wherein a concentration of ammonium chloride in the ammonium chloride wastewater is in a range of 0.35-2 mol/L, and a weight percentage content of calcium oxide in the carbide slag is greater than or equal to 60%.

3. The method of claim 1, wherein in the step (1), a weight ratio of the calcium oxide contained in the carbide slag to the ammonium chloride contained in the low-concentration ammonium chloride wastewater is 1:1.2-1.9.

4. The method of claim 1, wherein the carbide slag is replaced by quick lime, and a weight ratio of the quick lime to the ammonium chloride contained in the low-concentration ammonium chloride wastewater is 1:0.3-0.6.

5. The method of claim 1, wherein in the step (2), the separation of ammonia water as conducted in the ammonia-water evaporative concentration tower is performed by adjusting a vapor flow in such a manner that a tower top temperature is maintained at 90° C.-95° C. and a vapor pressure is in a range of 0.1 MPa-0.6 MPa.

6. The method of claim 1, wherein in the step (3), the cooling liquid adopted by the ammonia-water cooler is the ammonium chloride wastewater, the absorption liquid is the distilled water obtained from the step (5), and a cooling temperature is maintained at 10° C.-30° C.

7. The method of claim 1, wherein in the step (2), an aging time is greater than or equal to seven days.

* * * * *